(12) United States Patent
Lee et al.

(10) Patent No.: US 7,320,094 B2
(45) Date of Patent: Jan. 15, 2008

(54) RETRAINING DERIVED CLOCK RECEIVERS

(75) Inventors: Victor W. Lee, San Jose, CA (US); Phanindra K. Mannava, Folsom, CA (US); Akhilesh Kumar, Sunnyvale, CA (US); Sanjay Dabral, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 10/623,605

(22) Filed: Jul. 22, 2003

(65) Prior Publication Data

US 2005/0022100 A1 Jan. 27, 2005

(51) Int. Cl.
*H04L 7/00* (2006.01)

(52) U.S. Cl. ..................... 714/701; 375/357

(58) Field of Classification Search ............. 714/701, 714/807, 775, 776, 798; 341/59
See application file for complete search history.

(56) References Cited

U.S. PATENT DOCUMENTS

| | | | | |
|---|---|---|---|---|
| 4,536,876 A | * | 8/1985 | Bahr et al. | 370/453 |
| 5,025,256 A | * | 6/1991 | Stevens | 341/59 |
| 5,245,339 A | * | 9/1993 | Cideciyan | 341/95 |
| 5,940,018 A | * | 8/1999 | Kim et al. | 341/94 |
| 6,346,895 B1 | * | 2/2002 | Lee et al. | 341/58 |
| 6,496,540 B1 | * | 12/2002 | Widmer | 375/242 |
| 6,557,124 B1 | | 4/2003 | Cideciyan et al. | |
| 6,684,363 B1 | * | 1/2004 | Cassiday et al. | 714/776 |
| 6,897,792 B1 | * | 5/2005 | Feng | 341/59 |
| 6,914,637 B1 | * | 7/2005 | Wolf et al. | 348/473 |
| 6,941,425 B2 | * | 9/2005 | Osborne | 711/154 |
| 7,010,607 B1 | * | 3/2006 | Bunton | 709/228 |
| 2003/0011919 A1 | * | 1/2003 | Vasic et al. | 360/39 |

FOREIGN PATENT DOCUMENTS

EP 0 886 407 A2 12/1998

OTHER PUBLICATIONS

European Patent Office, International Search Report and Written Opinion for International Application No. PCT/US2004/022485, 12 pages, Nov. 24, 2004.
Ofek, Yoram, "The Conservative Code for Bit Synchronization," IEEE Transactions on Communications, vol. 38, No. 7, pp. 1107-1113, Jul. 1990.

* cited by examiner

*Primary Examiner*—Stephen M. Baker

(57) ABSTRACT

Systems and methods of retraining a receiver provide for determining a minimum transition density for a derived clock data link to the receiver. A retraining flit is generated based on the minimum transition density. In one approach, the retraining flit is generated by defining control data and payload data for the retraining flit. Error detection data is determined for the retraining flit based on the control and the payload data. The control data, the payload data and the error detection data have sufficient transitions to meet the minimum transition density.

27 Claims, 5 Drawing Sheets

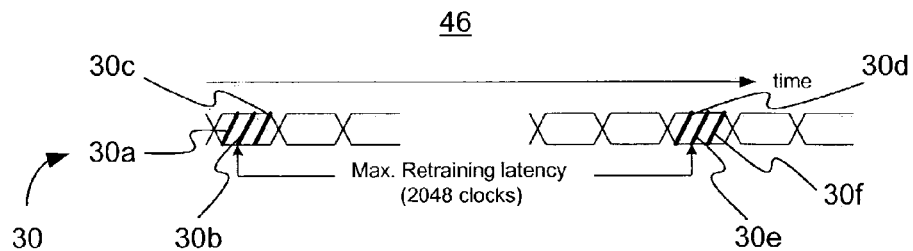
FIG. 4
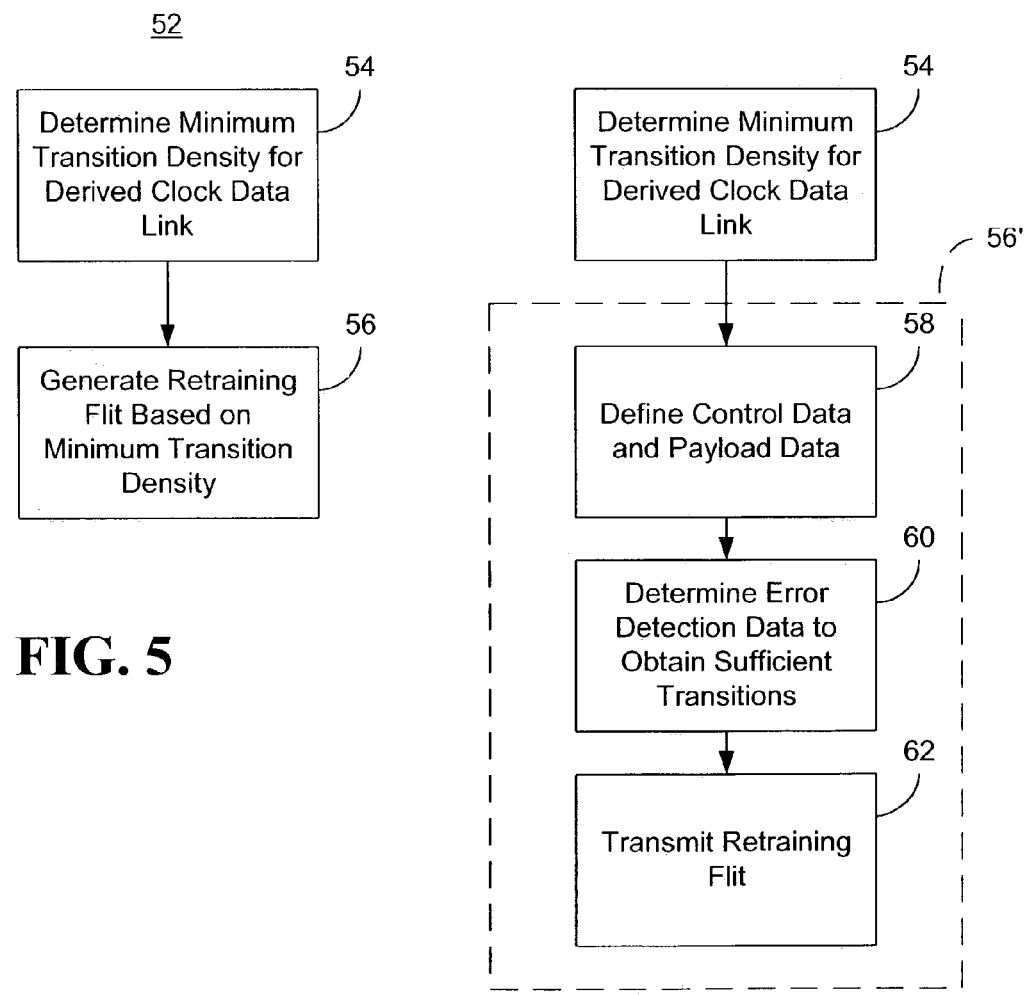
FIG. 5
FIG. 6

RETRAINING DERIVED CLOCK RECEIVERS

BACKGROUND

1. Technical Field

Embodiments of the present invention generally relate to point-to-point data links. More particularly, embodiments relate to the retraining of receivers in a derived clock data link.

2. Discussion

A data link is a point-to-point interconnect between agents, where in a given transaction one agent is a "transmitter" and the other agent is a "receiver". Example data links include a processor writing data to a disk drive, processors on separate boards in a computer system transferring data between one another, processors on the same board transferring data, etc. With any data link, in order for two agents to communicate, both agents must agree on the exact timing for sending and receiving data. This agreement is commonly known as the clocking scheme in link design. While several clocking schemes are used in industry, there remains considerable room for improvement.

For example, in a clocking scheme known as the "common clock" scheme, all agents in the interconnect share a single clock when sending and receiving data. Transmission protocol defines when transmitters send data and when receivers sample the data. Although such a scheme eliminates the need for synchronization between agents, the range of available clock frequencies can be limited because the clock must be propagated throughout the system for all agents to see and use.

In the "source synchronous" clocking scheme, the clock signal is sent along with the data signal. Such an approach relaxes the clock frequency limitations associated with the common clock scheme, but may increase the amount of non-payload data to be sent between the transmitter and receiver.

The "embedded" clocking scheme improves on the source synchronous clocking scheme by embedding the clock signal in the data transfer. As a result, the need for external clock signals can be eliminated. Receivers recover the clock from the data signal by interpolating from the transitions in data signals. A transition is defined as a change from logical "0" to logical "1" or vice versa. Due to environmental drift, however, each receiver must retrain its interpolator periodically in order to stay synchronized with the transmitter.

Certain embedded clocking schemes, such as 8-bit/10-bit (8B10B), address the concern over drift by attempting to maintain a certain minimum transition density for the outgoing data signal. Such a minimum transition density might be defined in terms of a minimum of "n" transitions over a period of "m" cycles, wherein n is a small integer between 2 and 5 and m is a larger integer between 1024 and 4096. These types of embedded clocking schemes allocate a relatively large amount of the signal to guarantee the minimum transition density for the entire data signal as well as other features such as DC balance and running disparity. DC balance is the property of having an equal number of ones and zeroes. For a signal to have good DC balance means there is a low frequency cutoff to the spectrum of the data signal below which no useful information is carried. Such a frequency cutoff can sometimes provide significant filtering and circuit design advantages. Running disparity helps the transmitter achieve DC balance by defining an ongoing maximum difference between the number of ones and zeroes. Maintaining DC balance and running disparity restraints for the entire data signal can provide a high quality, signal, but can also lead to an undesirably high amount of overhead. Indeed, the overhead associated with conventional 8B10B schemes is in the order of 20 percent. Although such an overhead may be acceptable under certain circumstances, there are some environments for which improvement is needed. For example, when transmitting small amounts of data over short distances and at high speeds, as in processor-to-processor communication on the same board or on nearby boards, the overhead associated with DC balance may not be worthwhile. There is therefore a need for a clocking scheme that provides for relatively low overhead.

BRIEF DESCRIPTION OF THE DRAWINGS

The various advantages of the embodiments of the present invention will become apparent to one skilled in the art by reading the following specification and appended claims, and by referencing the following drawings, in which:

FIG. 4 is a timing diagram of an example of insertion of a retraining flit into a data signal according to one embodiment of the invention;

FIG. 5 is a flowchart of an example of a method of retraining a receiver according to one embodiment of the invention;

FIG. 6 is a flowchart of an example of a process of generating a retraining flit according to one embodiment of the invention;

DETAILED DESCRIPTION

Figure 1A:
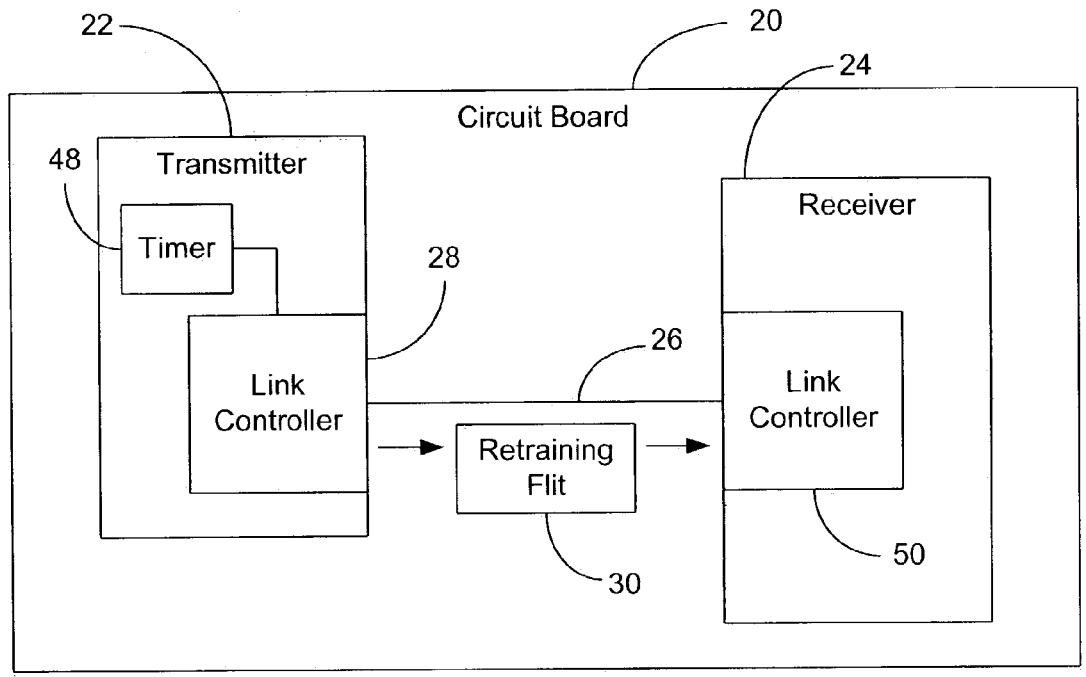
FIG. 1A is a diagram of an example of a communication system according to one embodiment of the invention.

FIG. 1A shows a circuit board 20 having a transmitter 22 and a receiver 24, where the transmitter 22 and receiver 24 communicate over a derived clock data link 26. Generally, the derived clock data link 26 is based on a scheme that is derivative of the conventional embedded clock scheme. In particular, the derived clock scheme eliminates certain features and overheads associated with embedded clock schemes. The transmitter 22, however, is still able to maintain a desired (or required) minimum transition density. Specifically, the transmitter 22 has a link controller 28 to determine a minimum transition density for the data link 26 and to transmit a retraining flit 30 to the receiver 24 over the data link 26 based on the minimum transition density. Transmission of the retraining flit 30 enables the derived clock data link 26 to maintain the minimum transition density while maximizing the throughput of payload data.

The transmitter 22 and receiver 24 may be processors that occupy a personal computer (PC) motherboard, where the data link 26 is a bus interconnecting the processors. Alternatively, the transmitter 22 and receiver 24 could be chips located on separate boards. In this regard, it should be noted that although the transmitter 22 and receiver 24 are illustrated as being in close proximity to one another (e.,g., signal trace less than approximately 40 inches long under current PCB technology), the embodiments of the invention are not so limited. For example, receiver 24 could be a disk drive operating at a distance on the order of 100 inches from transmitter 22, depending upon signal strength. Notwithstanding, there are a number of aspects of localized communication for which the embodiments are well suited. Indeed, the use of a retraining flit is particularly beneficial in environments in which the transmitter 22 and receiver 24 are relatively close, transmission rates are relatively high and small amounts of data are being transferred.

Figure 1B:
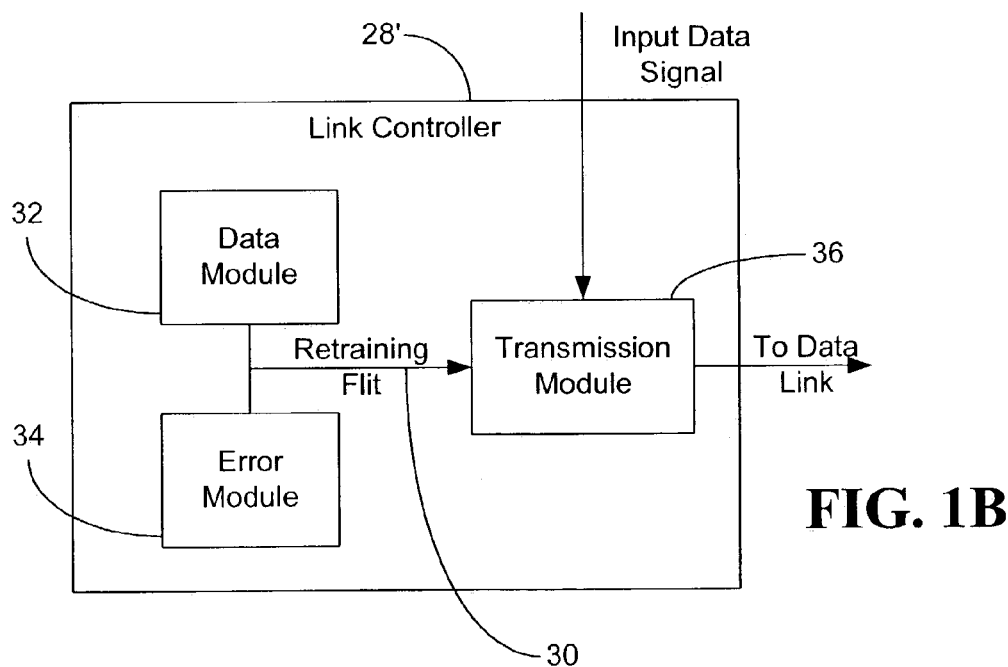
FIG. 1B is a diagram of an example of a link controller according to one embodiment of the invention.

With continuing reference to FIGS. 1A and 1B, one approach to a link controller 28' is shown in greater detail. Generally, link controller 28' receives an input data signal and transmits the signal to the data link 26. Periodically, the link controller 28' inserts the retraining flit 30 into the data signal in order to maintain the minimum transition density. Specifically, link controller 28' has a data module 32 to define control data and payload for the retraining flit 30. An error module 34 determines error detection data for the retraining flit 30 based on the control data and the payload data. The control data, the payload data, and the error detection data have sufficient transitions to meet the minimum transition density. As already discussed, such a transition density can be defined in terms of a minimum of "n" transitions over a period of "m" cycles, wherein "n" is a small integer between 2 and 5 and "m" is a larger integer between 1024 and 4096. A transition is defined as a change from logical "0" to logical "1" or vice versa. The data structure of the retraining flit 30 is discussed in greater detail below. Link controller 28' also has a transmission module 36 to transmit the retraining flit 32 to the receiver 24 over the data link 26 as part of a data signal;

In one embodiment, the error module 34 identifies a plurality of cyclic redundancy code (CRC) polynomials and determines a corresponding CRC checksum for each of the plurality of CRC polynomials based on the control data and,the payload data. The error module 34 can therefore select a CRC polynomial from the plurality of CRC polynomials, where the selected, CRC polynomial results in a CRC checksum that has sufficient transitions to meet the minimum transition density. In such a case, the error detection data includes the resulting CRC checksum. The error module 34 calculates each corresponding CRC checksum.

While CRC error checking techniques have been described by way of example, other techniques can be used without parting from spirit and scope of the embodiments of the invention. For example, parity checking, which is slightly less complex than CRC, and error code correction (ECC), which is slightly more complex than CRC, suitable alternatives. Indeed error detection data may be left out altogether.

Figure 2:
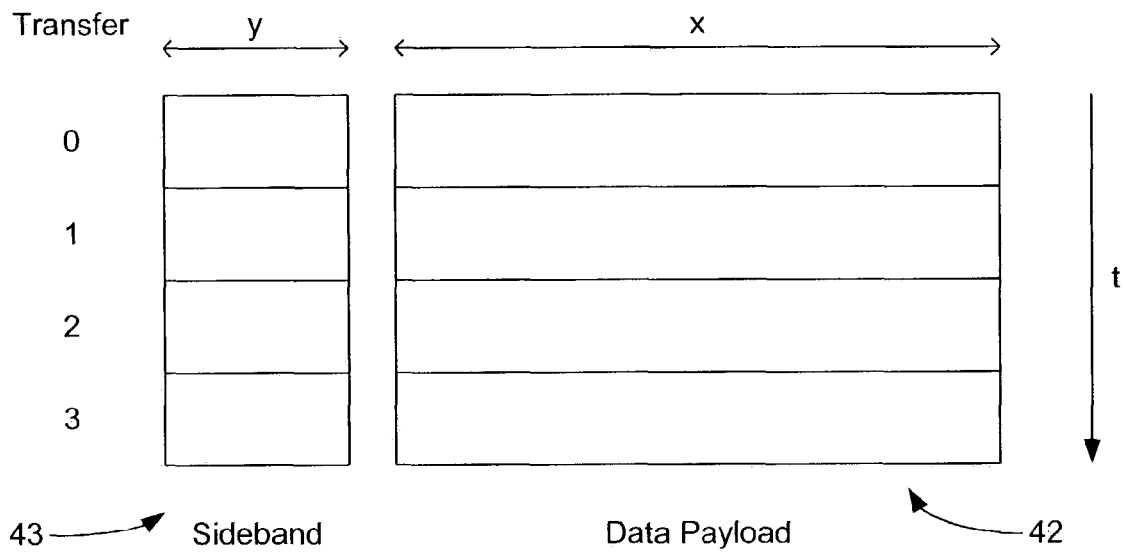
FIG. 2 is a diagram of an example of a retraining flit data structure according to one embodiment of the invention.
Figure 3:
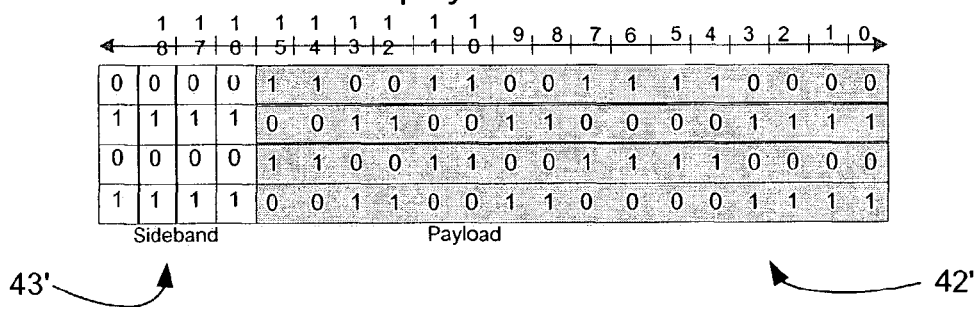
FIG. 3 is a diagram of an example of a retraining flit that meets a minimum transition density according to one embodiment of the invention.

Turning now to FIGS. 2 and 3, a data structure 40 of a retraining flit 30 and the content of an example retraining flit 30' are shown, respectively. Specifically, data structure 40 provides for a flit width that has a payload region 42 and a sideband region 43. The payload region 42 includes the payload data and the sideband region 43 includes the error detection data and the control data. The width of the retraining flit is defined by the number of bits (or wires/lines) in the data link 26 (FIG. 1A). The number of data transfers required to transmit the flit depends upon the overall size of the flit. In the illustrated example the retraining flit is transmitted in four data transfers. It is also possible to structure the flit in al different fashion, such as putting all data payload in each wire and spreading the control signal over all lines, etc. For example, Peripheral Component Interconnect Express (PCI Express™, 1.0 Base and Card Electromechanical Specifications, PCI Special Interest Group/SIG) flits are defined in the vertical fashion.

Thus, retraining flit 30' is twenty bits wide, with sixteen bits dedicated to the payload region 42' and four bits dedicated to the sideband region 43'. The retraining flit 30' is eighty bits long. In the illustrated case, the data module 32 (FIG. 1B) defines the payload data to have the maximum possible number of transitions per line. For example, the line assigned to bit position 0 of retraining flit 30' transitions from zero to one to zero back to one again (i.e., three transitions). The data module 32 (FIG. 1B) also staggers the payload data across the payload region 42' based on switching noise constraints. In other words, all of the payload lines in a given transfer do not have the same value. Such an approach reduces simultaneous switching noise. The control data can also be given the maximum possible number of transitions and a staggered distribution if necessary.

FIG. 4 shows a timing diagram 46 illustrating the transmission of retraining flits 30 (30a-30f) in greater detail. Generally, the link controller 28 (FIG. 1A) transmits multiple copies of the retraining flit 30 in order to meet minimum transition density. For example, retraining flits 30a-30c are transmitted during the first illustrated retraining period and retraining flits 30d-30f are transmitted during the second illustrated retraining period. Knowledge of the number of transitions on each line of the retraining flit 30 can be used to, calculate the number of retraining flits that must be transmitted during each retraining period. In the illustrated example, three retraining flits 30 are required to meet the minimum transition density. Furthermore, a timer 48 (FIG. 1A) is provided for the transmitter to count an amount of time elapsed since a previous retraining flit was transmitted. The link controller 28 (FIG. 1A) can therefore transmit the retraining flit 30 based on the amount of time elapsed.

Returning now to FIG. 1A, the receiver 24 has a link controller 50 that receives the retraining flit 30 as part of a data signal. Since the retraining flit 30 is included in the data signal, the link controller 50 can adjust an internal clock of the receiver 24 based on a number of transitions in the data signal. The link controller 50, after checking the received flit for errors and determining that no errors have occurred can also filter the retraining flit 30 out of the data signal before processing the data signal at the layers above the physical layer (PHY). It should be noted that in cases of bi-directional communication, the receiver 24 may include the components of transmitter 22 and vice, versa.

FIG. 5 shows a method 52 of retraining a receiver. Method 52 can be implemented using a wide variety of commercially available hardware and/or software programming techniques. For example, method 52 can be implemented in a transmitter as a set of instructions stored in a machine-readable medium such as read only memory (ROM), compact disk ROM (CD-ROM), electrically erasable programmable ROM (EEPROM), random access memory (RAM), a hardware state machine, etc., where the instructions are capable of being executed by a processor to determine the required retraining frequency and transition density. Specifically, processing block 54 provides for determining a minimum transition density for a derived clock data link to a receiver. A retraining flit is generated at block 56 based on the minimum transition density.

Turning now to FIG. 6, one approach to generating the retraining flit is shown at block 56' in greater detail. Specifically, control data and payload data are defined for the retraining flit at block 58. Block 60 provides for determining error detection data for the retraining flit based on the control data and the payload data. The control data, the payload data, and the error detection data have sufficient transitions to meet the minimum transition density. The retraining flit is transmitted to the receiver at block 62 over the data link as part of a data signal.

Figure 7:
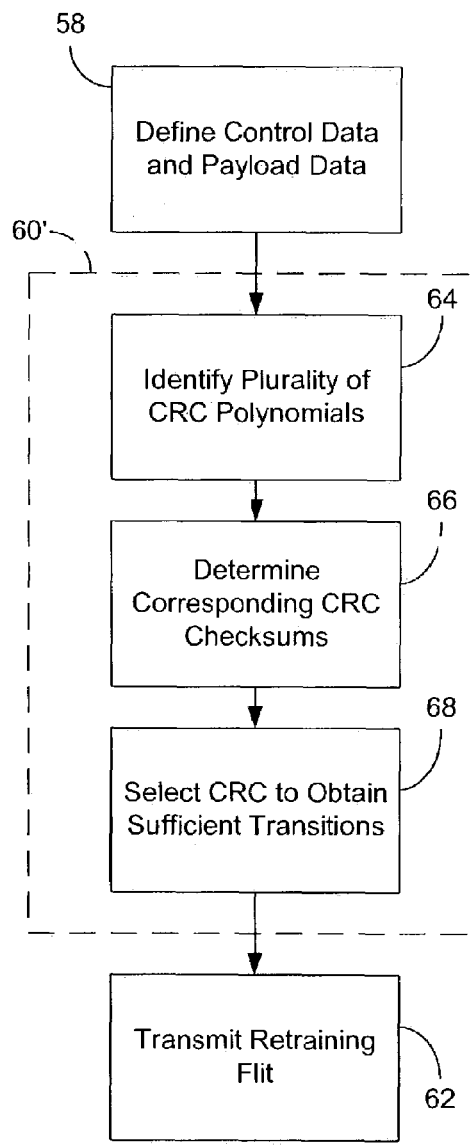
FIG. 7 is a flowchart of an example of a process of determining error detection data according to one embodiment of the invention.

FIG. 7 shows one approach to determining error detection data at block 60' in greater detail. Specifically, block 64 provides for identifying a plurality of CRC polynomials, where block 66 provides for determining a corresponding CRC checksum for each of the plurality of CRC polynomials based on the control data and the payload data. A CRC polynomial is selected from the plurality of CRC polynomials at block 68. The selected CRC polynomial results in a CRC checksum that has sufficient transitions to meet the minimum transition density, where the error detection data includes the resulting CRC checksum.

CRCs treat blocks of input bits as coefficient-sets for polynomials. For example, binary 10100000 implies the polynomial: $1*x^7+0*x^6+1*x^5+0*x^4+0*x^3+0*x^2+0*x^1+0*x^0$. This is the "information polynomial". A second polynomial, with constant coefficients, is called the "generator polynomial". The generator polynomial is divided into the information polynomial giving a quotient and remainder. The coefficients of the remainder form the bits of the final CRC checksum. Thus, a polynomial of degree 32 is necessary to generate a 32-bit CRC checksum. The exact bit-set used for the generator polynomial will naturally affect the CRC checksum that is computed. It should be noted that the checksum may alternatively be used as the error correction data. An error correcting code (such as an ECC code) has, less error detection capability compared to an equal size error detection code.

Figure 8:
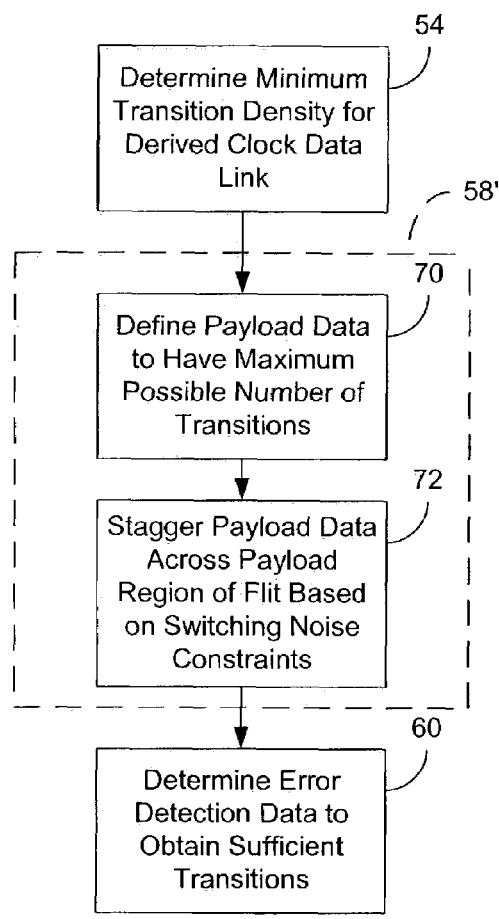
FIG. 8 is a flowchart of an example of a process of determining payload data for a retraining flit according to one embodiment of the invention.

FIG. 8 shows one approach to defining payload data at block 58' in greater detail. Specifically, block 70 provides for defining the payload data to have a maximum possible number of transitions. The payload data is staggered across a payload region of the retraining flit based on switching noise constraints. Similar definitions can be made for the control data to obtain the maximum possible number of transitions and a reduction in switching noise.

Figures 9, 10:
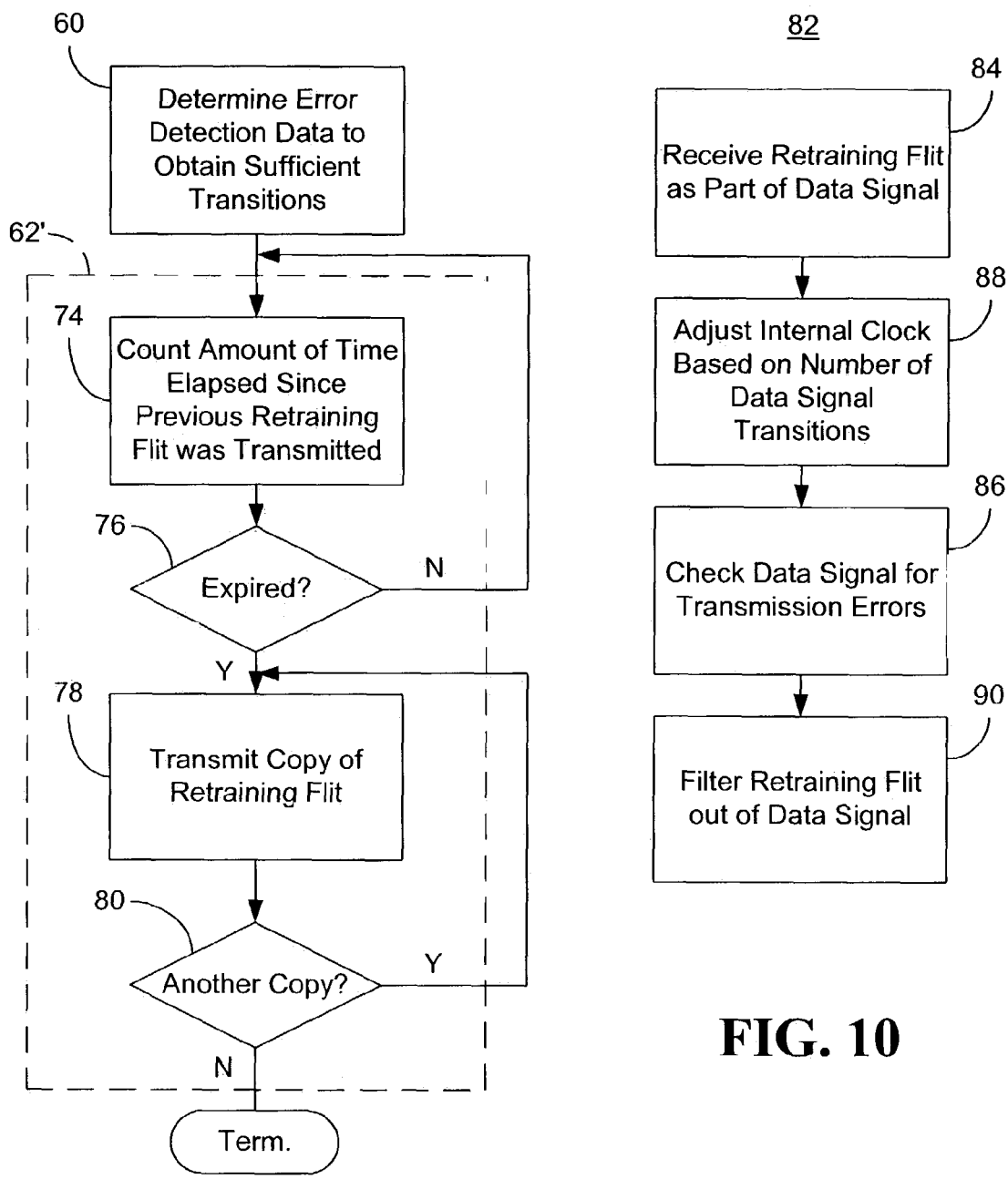
FIG. 9 is a flowchart of an example of a method of transmitting a retraining flit to a receiver according to one embodiment of the invention.
FIG. 10 is a flowchart of an example of a process of receiving a retraining flit according to one embodiment of the invention.

Turning now to FIG. 9, one approach to transmitting the retraining flit is shown at block 62' in greater detail. Specifically, block 74 provides for counting an amount of time elapsed since a previous retraining flit was transmitted. If it is determined at block 76 that the amount of time required for beginning another retraining period has expired, a copy of the retraining flit is transmitted at block 78. If it is determined at block 80 that multiple copies of the retraining flit are required, the process returns to block 78 to transmit multiple copies in order to meet the minimum transition density.

Turning now to FIG. 10, a method 82 of processing a retraining flit is shown. Method 82 can be implemented using a wide variety of commercially available hardware and/or software programming techniques. For example, method 82 can be implemented in a receiver as a set of instructions stored in a machine-readable medium, where the instructions are capable of being executed by a processor to process a retraining flit. Specifically, processing block 84 provides for receiving a retraining flit at a receiver as part of a data signal. Block 88 provides for adjusting an internal clock of the receiver based on the transitions in the data signal. Once the data signal is checked for transmission errors at block 86, the error free retraining flit is filtered out of the data signal at block 90.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of retraining a receiver comprising:
   identifying a minimum transition density for a derived clock data link to the receiver; and
   intermittently transmitting one or more retraining flits on the data link to the receiver to satisfy the minimum transition density, wherein modulation-coding is not employed.

2. The method of claim 1, further including:
   defining control data and payload data for the retraining flit;
   determining error detection data for the retraining flit based on the control data and the payload data, the control data, the payload data and the error detection data having sufficient transitions to meet the minimum transition density; and
   transmitting the retraining flit to the receiver over the data link as part of a data signal.

3. The method of claim 2, further including:
   defining the payload data to have a maximum possible number of transitions; and
   staggering the payload data across a payload region of the flit based on switching noise constraints.

4. The method of claim 2, wherein the flit has a width defined by a payload region and a sideband region, the payload region including the payload data and the sideband region including the error detection data and the control data.

5. The method of claim 2, further including transmitting multiple copies of the retraining flit to meet the minimum transition density.

6. The method of claim 2, further including:
   counting an amount of time elapsed since a previous retraining flit was transmitted; and
   transmitting the retraining flit based on the amount of time elapsed.

7. The method of claim 2, further including:
   identifying a plurality of cyclic redundancy code (CRC) polynomials;
   determining a corresponding CRC checksum for each of the plurality of CRC polynomials based on the control data and the payload data; and
   selecting a CRC polynomial from the plurality of CRC polynomials, the selected CRC polynomial resulting in a CRC checksum that has sufficient transitions to meet the minimum transition density, the error detection data including the resulting CRC checksum.

8. The method of claim 7, further including calculating each corresponding CRC checksum.

9. The method of claim 2, further including:
   receiving the retraining flit at the receiver as part of a data signal; and
   checking the data signal for transmission errors.

10. The method of claim 9, further including:
    adjusting an internal clock of the receiver based on a number of transitions in the data signal; and
    filtering the retraining flit out of the data signal.

11. A method of retraining a receiver comprising:
    identifying a required minimum transition density for a derived clock data link to the receiver;

counting an amount of time elapsed since a previous retraining flit was transmitted to the receiver;

defining control data and payload data for a current retraining flit;

staggering the payload data across a payload region of the current retraining flit based on switching noise constraints;

determining a cyclic redundancy code (CRC) checksum for the retraining flit based on the control data and the payload data, the control data, the payload data and the checksum having sufficient transitions to meet the required minimum transition density;

transmitting multiple copies of the current retraining flit to the receiver based on the required minimum transition density and the amount of time elapsed;

receiving the current retraining flit at the receiver as part of a data signal;

adjusting an internal clock of the receiver based on a number of transitions in the data signal;

checking the data signal for transmission errors; and filtering the retraining flit out of the data signal, wherein modulation-coding is not employed.

12. The method of claim 11, further including:

identifying a plurality of CRC polynomials;

determining a corresponding CRC checksum for each of the plurality of CRC polynomials based on the control data and the payload data; and selecting a CRC polynomial from the plurality of CRC polynomials, the selected CRC polynomial resulting in a CRC checksum that has sufficient transitions to meet the minimum transition density, the error detection data including the resulting CRC checksum.

13. The method of claim 11, further including calculating each corresponding CRC checksum.

14. A transmitter comprising:

a link controller to identify a minimum transition density for a derived clock data link to intermittently transmit over the data link one or more retraining flits to satisfy the minimum transition density, wherein modulation-coding is not employed.

15. The transmitter of claim 14, wherein the link controller is to transmit multiple copies of the retraining flit to meet the minimum transition density.

16. The transmitter of claim 14, further including a timer to count an amount of time elapsed since a previous retraining flit was transmitted, the link controller to transmit the retraining flit based on the amount of time elapsed.

17. The transmitter of claim 14, wherein the link controller further includes:

a data module to define control data and payload data for the retraining flit;

an error module to determine error detection data for the retraining flit based on the control data and the payload data, the control data, the payload data and the error detection data having sufficient transitions to meet the minimum transition density; and a transmission module to transmit the retraining flit to the receiver over the data link as part of a data signal.

18. The transmitter of claim 17, wherein the data module is to define the payload data to have a maximum possible number of transitions and to stagger the payload data across a payload region of the flit based on switching noise constraints.

19. The transmitter of claim 17, wherein the flit is to have a width defined by a payload region and a sideband region, the payload region to include the payload data and the sideband region to include the error detection data and the control data.

20. The transmitter of claim 17, wherein the error module is to identify a plurality of cyclic redundancy code (CRC) polynomials, to determine a corresponding CRC checksum for each of the plurality of CRC polynomials based on the control data and the payload data, and to select a CRC polynomial from the plurality of CRC polynomials, the selected CRC polynomial to result in a CRC checksum that has sufficient transitions to meet the minimum transition density, the error detection data to include the resulting CRC checksum.

21. The transmitter of claim 20, wherein the error module is to calculate each corresponding CRC checksum.

22. A communication system comprising:

a derived clock data link;

a receiver coupled to the data link; and a transmitter coupled to the data link, the transmitter including a link controller to identify a minimum transition density for the data link and to intermittently transmit a retraining flit to the receiver over the data link to satisfy the minimum transition density, wherein modulation-coding is not employed.

23. The system of claim 22, wherein the receiver and the transmitter are processors and the data link is a bus interconnecting the processors.

24. The system of claim 22, wherein the link controller further includes:

a data module to define control data and payload data for the retraining flit; and an error module to determine error detection data for the retraining flit based on the control data and the payload data, the control data, the payload data and the error detection data to have sufficient transitions to meet the minimum transition density.

25. The system of claim 24, wherein the error module is to identify a plurality of CRC polynomials, to determine a corresponding CRC checksum for each of the plurality of CRC polynomials based on the control data and the payload data, and to select a CRC polynomial from the plurality of CRC polynomials, the selected CRC polynomial to result in a CRC checksum that has sufficient transitions to meet the minimum transition density, the error detection data to include the resulting CRC checksum.

26. A machine readable medium comprising a stored set of instructions capable of being executed by a processor to:

identify a minimum transition density for a data link to a receiver; and intermittently transmit a retraining flit to the receiver over the data link to satisfy the minimum transition density wherein modulation-coding is not employed.

27. The medium of claim 26, wherein the instructions are further capable of being executed to:

define control data and payload data for the retraining flit; and determine error detection data for the retraining flit based on the control data and the payload data, the control data, the payload data and the error detection data having sufficient transitions to meet the minimum transition density.

* * * * *